(12) United States Patent
Ukai

(10) Patent No.: US 6,746,186 B2
(45) Date of Patent: Jun. 8, 2004

(54) BORING TOOL

(75) Inventor: Kazuhiro Ukai, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 279 days.

(21) Appl. No.: 10/090,785

(22) Filed: Mar. 6, 2002

(65) Prior Publication Data

US 2002/0168240 A1 Nov. 14, 2002

(30) Foreign Application Priority Data

May 8, 2001 (JP) .......................................... 2001-003828

(51) Int. Cl.$^7$ ................................................ B23B 51/02
(52) U.S. Cl. ........................ 408/226; 408/230; 411/410; 411/919
(58) Field of Search ................................ 408/122, 123, 408/226, 227, 229, 230; 279/143, 144, 145; 411/403, 404, 410, 919

(56) References Cited

U.S. PATENT DOCUMENTS

| | | | | |
|---|---|---|---|---|
| 3,272,211 A | * | 9/1966 | Leopold, Jr. et al. .... | 137/15.13 |
| 3,277,683 A | * | 10/1966 | Knoblock ....................... | 72/71 |
| 5,219,250 A | * | 6/1993 | Voorhees ...................... | 407/34 |
| 5,466,100 A | * | 11/1995 | Ahluwalia ................... | 408/224 |

FOREIGN PATENT DOCUMENTS

JP    6-322325    8/1994

* cited by examiner

Primary Examiner—Daniel W. Howell
(74) Attorney, Agent, or Firm—Wenderoth, Lind & Ponack, L.L.P.

(57) ABSTRACT

A boring tool is proposed which has a cutting portion at one end thereof, a driver engaging portion at the other end thereof, a shank arranged between the cutting portion and the driver engaging portion. The shank is formed with a helical groove for discharging cuttings. The driver engaging portion has a hexagonal outer shape and is formed with a hexagonal hole and a recess at bottom of the hexagonal hole for receiving the tip of a driver. The cutting portion has a pointed tip and a substantially conical shape, a first recess formed by cutting off substantially a 180° section of the cutting portion as seen axially from the pointed tip with an edge in the rotational direction forming a cutting edge, and a second recess formed by cutting off substantially a 90° section of the remaining 180° section. The second recess is separated from the first recess by a thin-walled partitioning wall.

6 Claims, 6 Drawing Sheets

US 6,746,186 B2

BORING TOOL

BACKGROUND OF THE INVENTION

The present invention relates to a boring tool used to form a bore when a plug, an anchor or the like used to mount an instrument is inserted into a brittle wall substrate such as a plaster board.

Heretofore, as such a boring tool, a drill is used which is to be mounted on an electric drill and has a shank portion having a helical shape except its mounting portion, and a cutting edge having a pointed tip.

Also, as one for a manual driver, JP utility model publication 6-32325 proposes such a boring tool.

But when various kinds of instruments are mounted to a brittle wall surface substrate such as a plasterboard, troublesome work was needed. Namely, after boring has been made in the wall surface substrate with a drill mounted to an electric power tool, the drill is removed from the power tool and a driver bit or a hexagonal socket has to be mounted on the power tool to thread a screw or a bolt into a plug or anchor inserted through an instrument into the wall surface substrate. Otherwise, it was necessary to prepare another power tool to which is mounted a driver bit or a hexagonal socket in addition to a power tool to which is mounted a drill.

Also, in order to solve this problem, JP utility model publication 6-32325 for a manual driver was proposed. But since the driver bit is fitted in the boring tool only at its tip, rattling will develop, thus making accurate boring difficult. Also, if it is used with an electric power tool, there was a problem that the fitting portion tends to get damaged soon.

SUMMARY OF THE INVENTION

According to this invention, there is provided a boring tool comprising a cutting portion at one end thereof, a driver engaging portion at the other end thereof, a shank arranged between the cutting portion and the driver engaging portion, the driver engaging portion being formed with a hexagonal hole and a cross recess at bottom of the hexagonal hole for receiving the tip of a cross head driver or driver bit.

According to the present invention, there is also provided a boring tool comprising a cutting portion at one end thereof, a driver engaging portion at the other end thereof, a shank 6 arranged between the cutting portion and the driver engaging portion, the shank being formed with a helical groove for discharging cuttings, the driver engaging portion having a hexagonal outer shape and formed with a hexagonal hole and a recess at bottom of the hexagonal hole for receiving the tip of a driver, a circular flange provided between the driver engaging portion and the shank and having a larger diameter than the outer diameter of the shank, the cutting portion having a pointed tip and a substantially conical shape spreading from the pointed tip toward the outer periphery of the shank, a first recess formed by cutting off substantially a 180° section of the cutting portion as seen axially from the pointed tip with an edge in the rotational direction forming a cutting edge, and a second recess formed by cutting off substantially a 90° section of the remaining 180° section, the second recess being separated from the first recess by a thin-walled partitioning wall.

Other features and objects of the present invention will become apparent from the following description made with reference to the accompanying drawings, in which:

DETAILED DESCRIPTION OF THE PREFERRED EMBODIMENT

Figure 1:
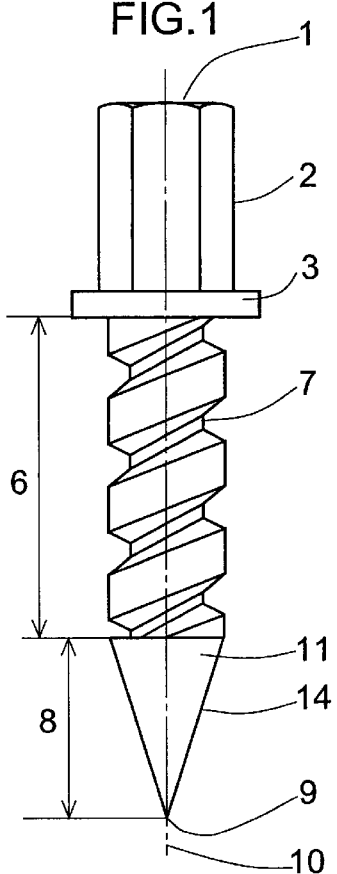
FIG. 1 is a front view of the boring tool according to the present invention.
Figure 2:
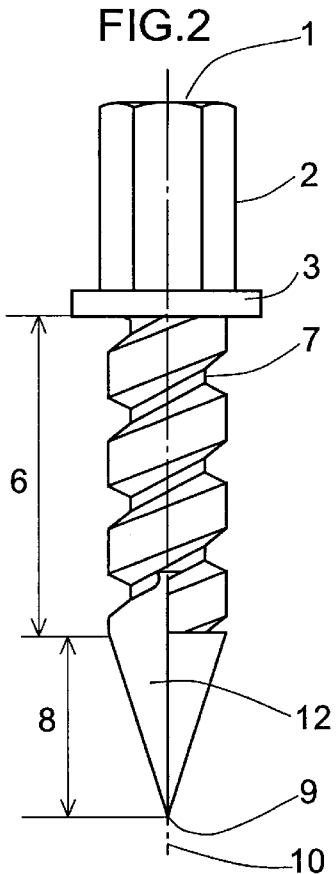
FIG. 2 is a back view of the same.
Figure 3:
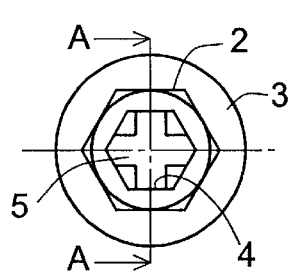
FIG. 3 is a plan view of the same.
Figure 4:
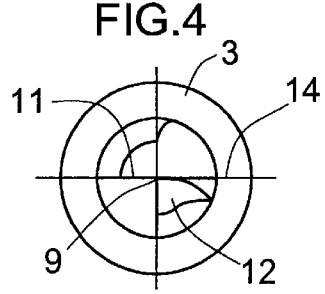
FIG. 4 is a bottom view of the same.
Figure 5:
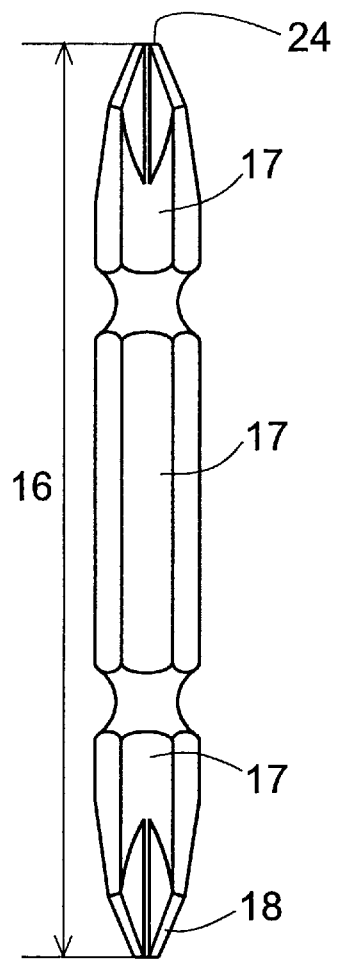
FIG. 5 is a front view of a hexagonal driver bit.
Figure 6:
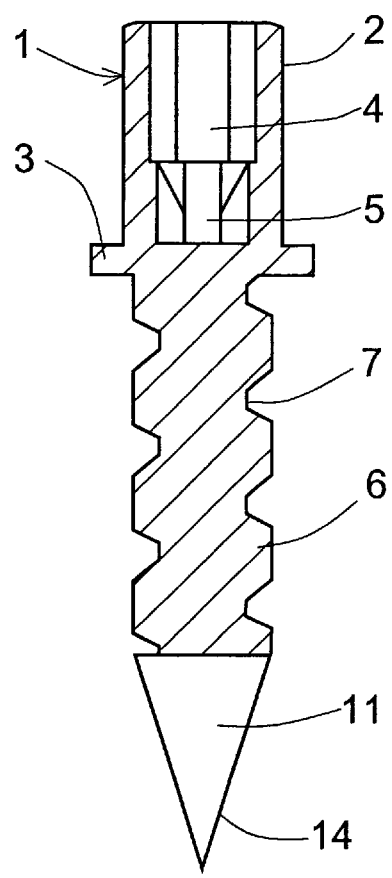
FIG. 6 is a sectional view taken along line A—A of FIG. 3.
Figure 7:
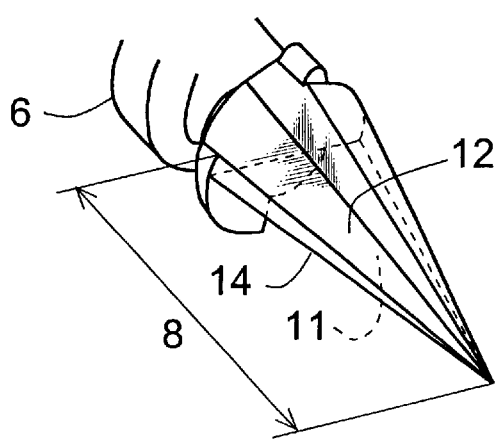
FIG. 7 is a perspective view of the cutting portion of the same.

Hereinbelow, preferred embodiments of this invention will be described with reference to the attached drawings.

As shown in FIGS. 1–7, a boring tool 1 embodying the present invention comprises a cutting portion 8 at its tip, a shank 6 formed with a helical groove 7 for discharging cuttings and a driver engaging portion 2 at its rear end. The driver engaging portion 2 is in the shape of a hexagonal pillar and has a hexagonal hole 4 extending axially and having a bottom. At the bottom of the hole 4, a cross recess 5 is formed to receive the tip of a cross head driver. Between the driver engaging portion 2 and the shank 6, a circular flange 3 is provided which has a larger diameter than the outer diameter of the shank 6. A hexagonal driver bit 16 (FIG. 5) for an electric driver has a hexagonal shank 17 that fits in the hexagonal hole 4 formed in the driver engaging portion 2.

The cutting portion 8 has such a conical shape as to spread from a pointed tip 9 on the central axis toward the outer periphery of the shank 6. As seen in the axial direction from the tip 9, a substantially 180° section of the cutting portion 8 is cut off to form a first recess 11 with the edge in the rotational direction forming a drilling edge 14. Of the remaining 180° section, a substantially 90° section is cut off to form a second recess 12 separated from the first recess 11 by a thin-walled partition.

Figure 8A:
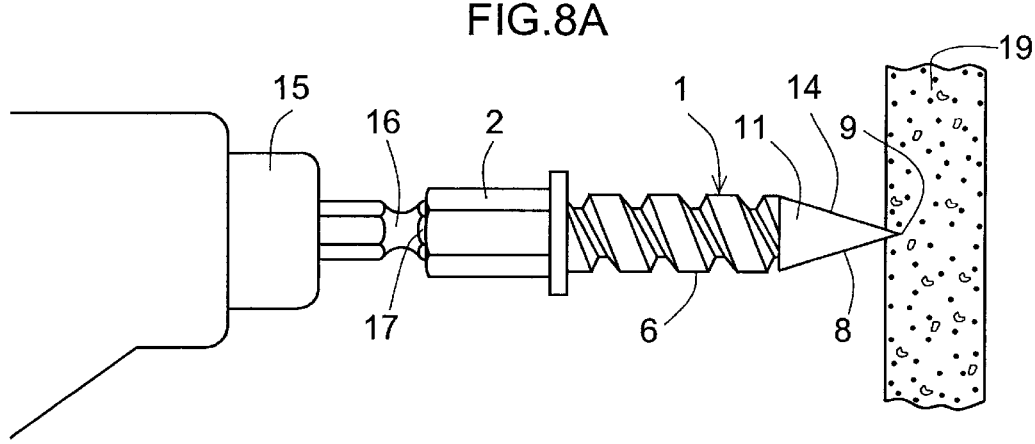
FIGS. 8A, 8B, and 8C are views showing how the boring tool is used.
Figure 8B:
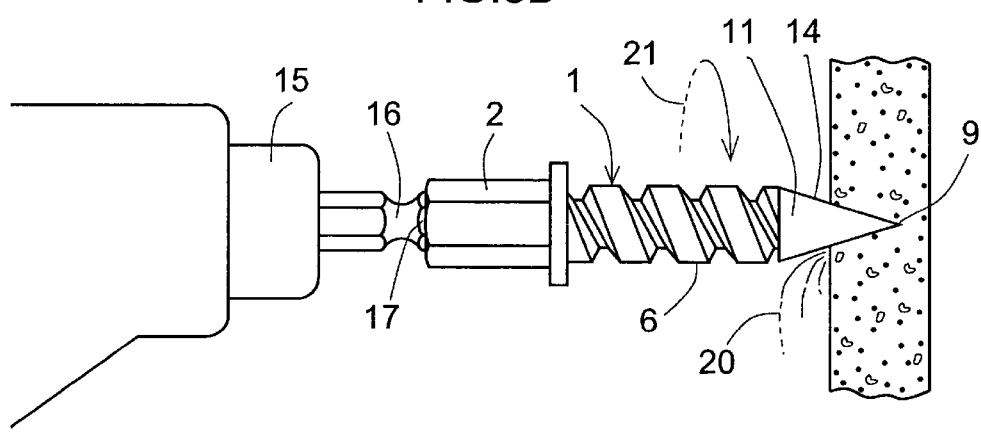
Figure 8C:
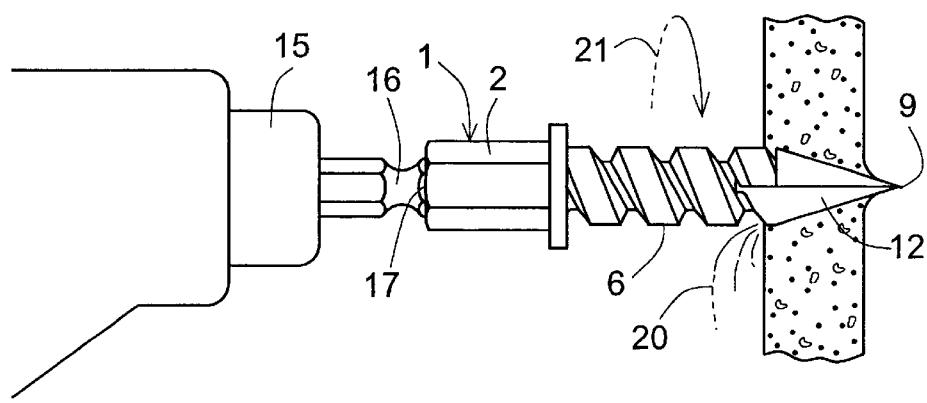
Figure 9:
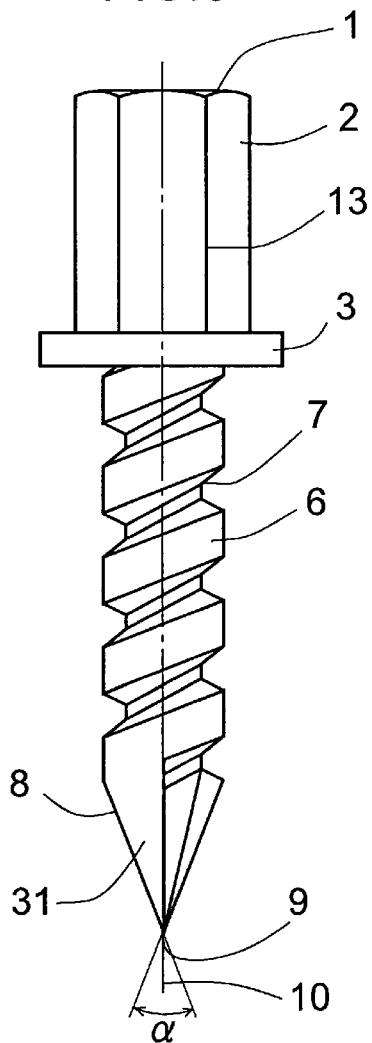
FIG. 9 is a front view of the second embodiment.
Figure 12:
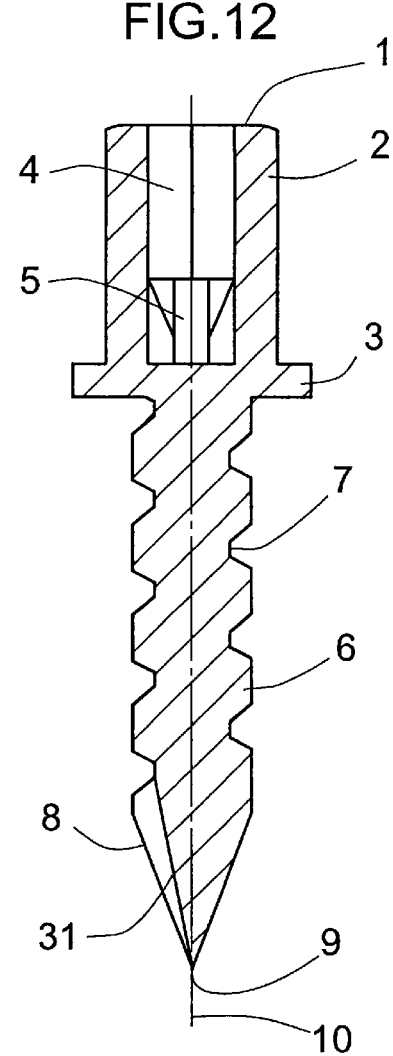
FIG. 12 is a sectional view of the same taken along line A—A of FIG. 10.
Figure 10:
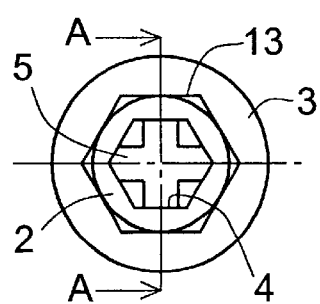
FIG. 10 is a plan view of the same.

The boring tool 1 of the first embodiment is structured as above. As shown in FIG. 8, a hexagonal cross head driver bit 16 mounted on an electric driver 15 is inserted into the hole 4 of a driver engaging portion 2. By adjusting the position of the driver bit 16, a cross tip 24 of the driver bit 16 will fit in the cross hole 5 formed in the bottom of the driver engaging portion 2. Since the hexagonal shank 17 of the hexagonal cross head driver bit 16 makes a surface contact with the inner periphery of the hole 4 of the driver engaging portion 2, an effect of biting the boring tool 1 is achieved, so that it will not shake. Even with a cross head driver bit having a circular shank such as a manual cross head driver, since the circular shank abuts the inner periphery of the hole 4 of the driver engaging portion 2 along the longitudinal axis, it will not shake. Thus, turning force of the electric driver 15 is stably transmitted to the boring tool 1.

If a hexagonal socket bit is used instead of the hexagonal driver bit 16 to tighten a hexagonal bolt to mount an instrument, by engaging the driver engaging portion 2 with the hexagonal socket bit, the boring tool 1 will not shake. Even with various kinds of driver, shaking is prevented and the turning force is stably transmitted to the boring tool 1.

In drilling into a brittle wall substrate such as plasterboard 19, accurate positioning of the bore is possible since the pointed tip 9 of the cutting portion 8 sticks in the brittle wall substrate. Also, since drilling is carried out by gradually increasing the diameter, "flowering" phenomenon will hardly occur in the back of the plasterboard 19.

In the present invention, because the second recess 12 is provided in the back of the drilling blade to increase the flank, it is possible to increase the chip discharging capability and permit efficient drilling.

By providing the flange 3 having a larger diameter than the diameter of the shank 6 between the driver-engaging portion 2 and the shank 6, the flange 3 serves as a stopper.

Figure 11:
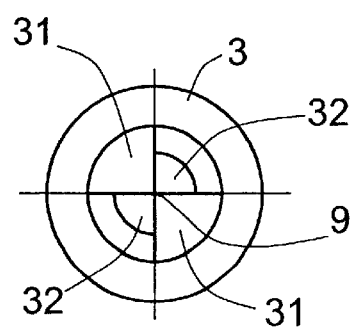
FIG. 11 is a bottom view of the same.

In the second embodiment shown in FIGS. 9–12, a pair of cutting sections 31 having their maximum diameter portions coinciding with the end face of the shank 6 at its tip, and having their both sides extending from the outer peripheral surface toward the central axis as flat surfaces are opposed to each other so as to be symmetrical with respect to the central axis of the boring tool, and a pair of chip discharging recesses 32 having their diameter gradually and linearly increasing from the pointed tip 9 are opposed to each other so as to be symmetrical with respect to the central axis 10 of the boring tool 1 and be disposed between the cutting sections 31 as shown in FIG. 11.

Figure 13A:
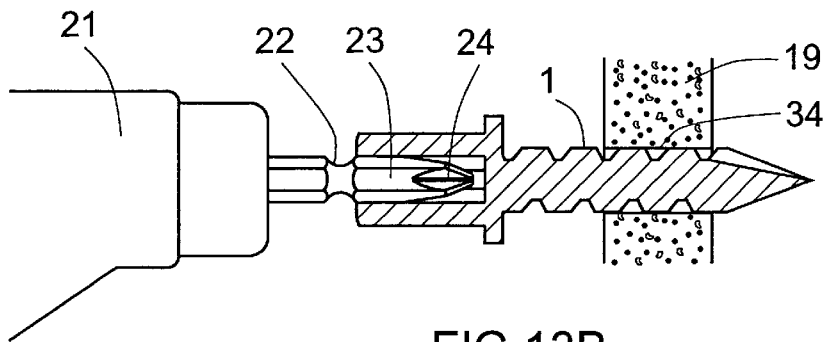
FIGS. 13A, 13B, and 13C are views showing how the boring tool of the second embodiment is used.

As shown in FIG. 13A, when boring is done in a brittle wall surface substrate such as a plasterboard 19, chips produced by the cutting sections 31 pass from the pointed tip 9 through the chip discharging recesses 32 and the helical groove 7 and discharged out of the wall surface substrate 19.

At this time, since the chip-discharging recesses 32 have their diameter gradually and linearly increasing and have their maximum diameter portions coinciding with the end face of the shank 6 at its tip, it is possible to discharge chips out of the wall surface substrate without staying in the chip discharging recesses 32. This prevents blooming in which on the backside of the wall surface substrate, the edge of the through hole is destroyed, which often occurs during boring.

Figure 13B:
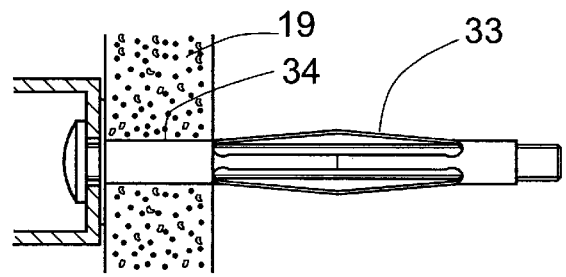
Figure 13C:
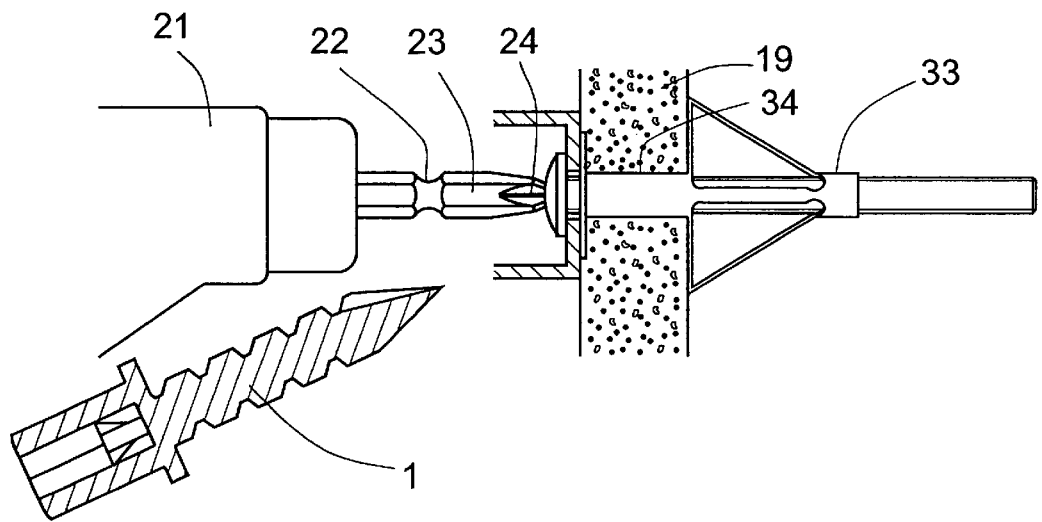
Figure 14:
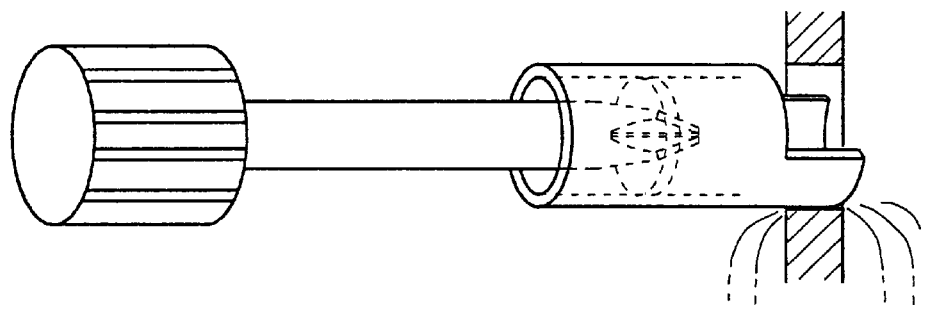
FIG. 14 is a perspective view of a prior art tool.

When boring is complete, as shown in FIG. 13B, a plug 33 is inserted into the hole 34, the boring tool 1 is pulled out of the hexagonal cross bit 22, and an instrument is mounted by turning a screw with the hexagonal cross bit 22.

Also, if boring is done in a plasterboard having plaster sandwiched between paper sheets, in order to form a through hole without tearing the paper on the back of the board to a greater degree than is necessary, the tip angle α (FIG. 9) of the cutting portion 8 preferably has an acute angle of about 45 degrees. In order to produce the boring tool 1 at a low cost, it may be integrally formed by injection molding.

According to this invention, since boring is possible with a driver bit or a hexagonal socket mounted to the electric power tool, troublesome work is not needed. This saves much labor. Also, since it penetrates the plasterboard without tearing the paper on the back of the plasterboard to a greater degree than is necessary, the ability of the plug inserted into the through hole can be revealed stably.

With the boring tool according to this invention, because the first and second recesses are provided, it is possible to increase the drilling ability into brittle wall substrate such as a plasterboard.

By increasing the drilling ability, wasteful consumption of a battery as the power for the power tool 15 can be suppressed.

What is claimed is:

1. A boring tool comprising a cutting portion at one end thereof, a driver engaging portion at the other end thereof, a shank arranged between said cutting portion and said driver engaging portion, said driver engaging portion being formed with a hexagonal hole and a cross recess at bottom of said hexagonal hole for receiving the tip of a cross head driver or driver bit.

2. The boring tool as claimed in claim 1 wherein said driver engaging portion has a hexagonal outer periphery.

3. The boring tool as claimed in claim 1 wherein said shank is formed with a helical groove for discharging chips, said cutting portion having a substantially conical shape so as to spread from a pointed tip thereof toward the outer periphery of said shank, and said cutting portion comprising a pair of cutting sections diametrically opposed to each other and a pair of chip discharging recesses diametrically opposed to each other, each of said chip discharging recesses being arranged between said cutting sections.

4. The boring tool as claimed in claim 3, further comprising a circular flange disposed between said driver engaging portion and said shank.

5. A boring tool comprising a cutting portion at one end thereof, a driver engaging portion at the other end thereof, a shank arranged between said cutting portion and said driver engaging portion, said shank being formed with a helical groove for discharging cuttings, said driver engaging portion having a hexagonal outer shape and formed with a hexagonal hole and a recess at bottom of said hexagonal hole for receiving the tip of a driver, a circular flange provided between said driver engaging portion and said shank and having a larger diameter than the outer diameter of said shank, said cutting portion having a pointed tip and a substantially conical shape spreading from said pointed tip toward the outer periphery of said shank, a first recess formed by cutting off substantially a 180° section of said cutting portion as seen axially from said pointed tip with an edge in the rotational direction forming a cutting edge, and a second recess formed by cutting off substantially a 90° section of the remaining 180° section, said second recess being separated from said first recess by a thin-walled partitioning wall.

6. The boring tool as claimed in claim 2 wherein said shank is formed with a helical groove for discharging chips, said cutting portion having a substantially conical shape so as to spread from a pointed tip thereof toward the outer periphery of said shank, and said cutting portion comprising a pair of cutting sections diametrically opposed to each other and a pair of chip discharging recesses diametrically opposed to each other, each of said chip discharging recesses being arranged between said cutting sections.

* * * * *